(12) United States Patent
Yamamoto et al.

(10) Patent No.: US 11,982,278 B2
(45) Date of Patent: May 14, 2024

(54) PUMP DEVICE

(71) Applicant: NIDEC SANKYO CORPORATION, Nagano (JP)

(72) Inventors: Takashi Yamamoto, Nagano (JP); Takehiko Yazawa, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 0 days.

(21) Appl. No.: 17/749,145

(22) Filed: May 20, 2022

(65) Prior Publication Data
US 2022/0381248 A1 Dec. 1, 2022

(30) Foreign Application Priority Data

May 31, 2021 (JP) ................................. 2021-091230

(51) Int. Cl.
| | |
|---|---|
| *F04D 13/06* | (2006.01) |
| *F04D 29/22* | (2006.01) |
| *F04D 29/62* | (2006.01) |
| *H02K 7/14* | (2006.01) |

(52) U.S. Cl.
CPC ....... *F04D 13/064* (2013.01); *F04D 13/0606* (2013.01); *F04D 13/0626* (2013.01); *F04D 13/0633* (2013.01); *F04D 29/2222* (2013.01); *F04D 29/628* (2013.01); *H02K 7/14* (2013.01)

(58) Field of Classification Search
CPC .......... F04D 13/064; F04D 1/00; F04D 13/06; F04D 13/0633; F04D 25/06; F04D 29/2222; F04D 29/628; F04D 13/0606; H02K 1/2706; H02K 1/2733; H02K 15/03; H02K 7/14; H02K 1/146

See application file for complete search history.

(56) References Cited

U.S. PATENT DOCUMENTS

2014/0271279 A1* 9/2014 Kuba .................. F04D 13/0606
 417/420
2018/0233976 A1* 8/2018 Kuratani .............. H02K 1/2733

FOREIGN PATENT DOCUMENTS

| JP | 2010246238 | | 10/2010 | | |
|---|---|---|---|---|---|
| JP | 2010246238 A | * | 10/2010 | ......... | F04D 13/0606 |

* cited by examiner

*Primary Examiner* — Dominick L Plakkoottam
(74) *Attorney, Agent, or Firm* — JCIPRNET

(57) ABSTRACT

A pump device includes a motor and an impeller which is disposed in a pump chamber provided on one side in a rotation center axial line with respect to the motor and is connected with a rotor of the motor. The rotor is made of resin and includes a seat part which supports an end part on one side of a drive magnet and a cylindrical tube part which is extended from the seat part along the rotation center axial line and is fitted to an inner side of the drive magnet. An outer peripheral face of the cylindrical tube part is provided with a rib extended along the rotation center axial line at a plurality of positions in a circumferential direction, and the drive magnet is press-fitted to the cylindrical tube part so as to contact with the rib from an outer side in a radial direction.

7 Claims, 10 Drawing Sheets

PUMP DEVICE

CROSS REFERENCE TO RELATED APPLICATIONS

The present invention claims priority under 35 U.S.C. § 119 to Japanese Application No. 2021-091230 filed May 31, 2021, the entire content of which is incorporated herein by reference.

FIELD OF THE INVENTION

At least an embodiment of the disclosure may relate to a pump device which is structured to rotate an impeller by a motor.

BACKGROUND

In a pump device, an impeller which is disposed in a pump chamber is rotated by a motor. In the motor, a rotor is provided with a cylindrical tube part which holds a radial bearing in a cylindrical tube shape on its inner side, and a drive magnet in a cylindrical tube shape is fixed on an outer peripheral side of the cylindrical tube part. Thermal expansion coefficients of the rotor and the drive magnet are different from each other and thus, when temperature change rapidly occurs and large stress is applied to the drive magnet, the drive magnet may be broken. In order to prevent this problem, a structure has been proposed in which a gap space is provided between the rotor and the drive magnet, and a sealing material having elasticity which is made of an adhesive or the like is filled in the gap space).

However, in a conventional structure that a gap space for disposing sealing material having elasticity is provided between the rotor and the drive magnet, eccentricity may occur between the rotor and the drive magnet and, in this case, wobbling may easily occur in rotation of the rotor.

SUMMARY

According to an exemplary embodiment of the disclosure, there may be provided a pump device including a motor, and an impeller disposed in a pump chamber provided on one side in a rotation center axial line with respect to the motor and connected with a rotor of the motor. The rotor is made of resin, and the rotor is provided with a seat part supporting an end part on one side of a drive magnet in a cylindrical tube shape, and a cylindrical tube part extended from the seat part along the rotation center axial line and fitted to an inner side of the drive magnet. An outer peripheral face of the cylindrical tube part is provided with a rib extended along the rotation center axial line at a plurality of positions in a circumferential direction, and the drive magnet is press-fitted to the cylindrical tube part so as to contact with the rib from an outer side in a radial direction.

The above and other elements, features, steps, characteristics and advantages of the present disclosure will become more apparent from the following detailed description of the preferred embodiments with reference to the attached drawings.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

A motor 10 and a pump device 1 in accordance with at least an embodiment of the disclosure will be described below with reference to the accompanying drawings. In the following descriptions, a rotation center axial line "L" direction means a direction that a rotation center axial line "L" is extended, a radial direction on an inner side in the radial direction and on an outer side in the radial direction means a radial direction with the rotation center axial line "L" as a center, and a circumferential direction means a rotation direction with the rotation center axial line "L" as a center.

Figure 1:
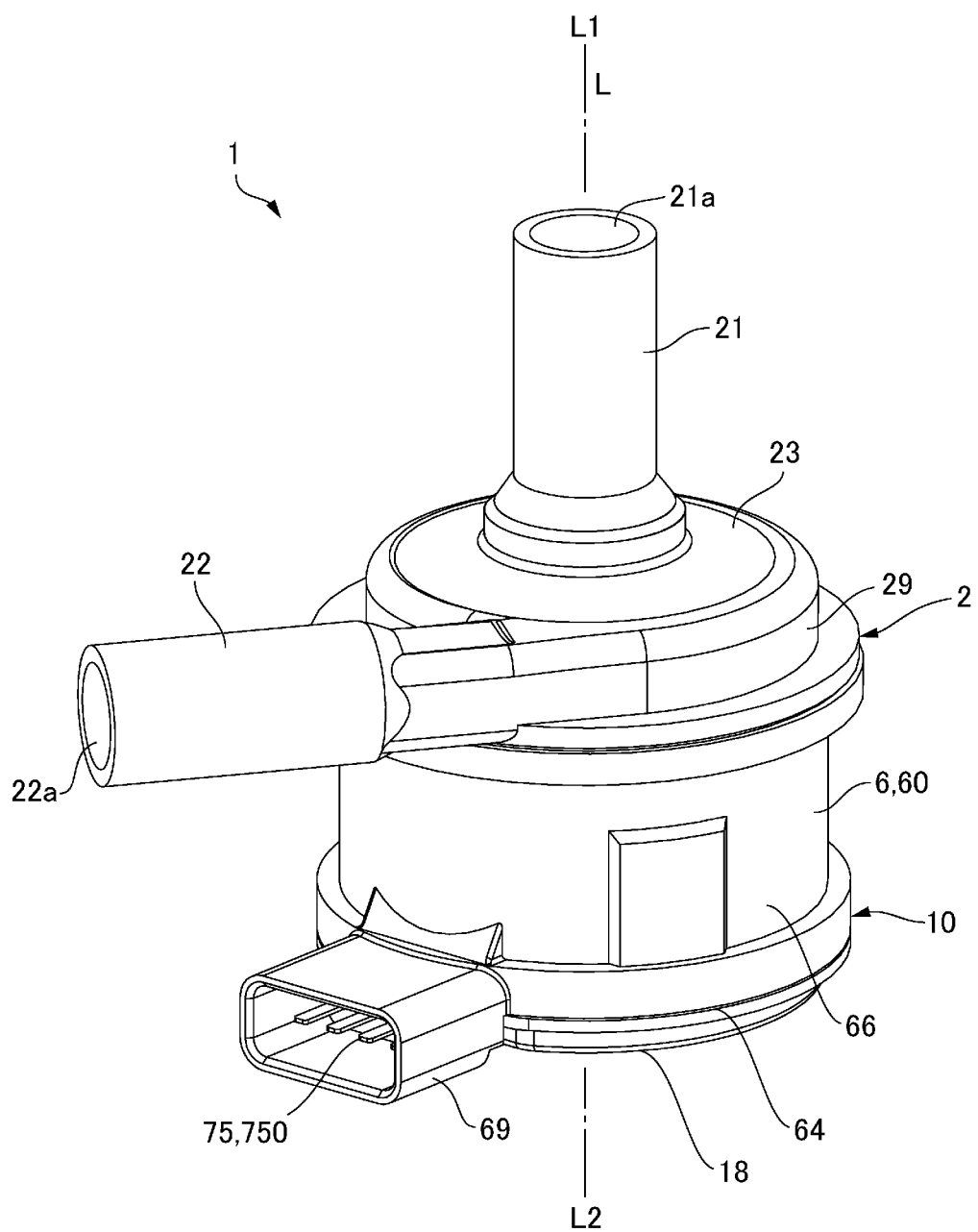
FIG. 1 is a perspective view showing an embodiment of a pump device and a motor to which the disclosure is applied.
Figure 2:
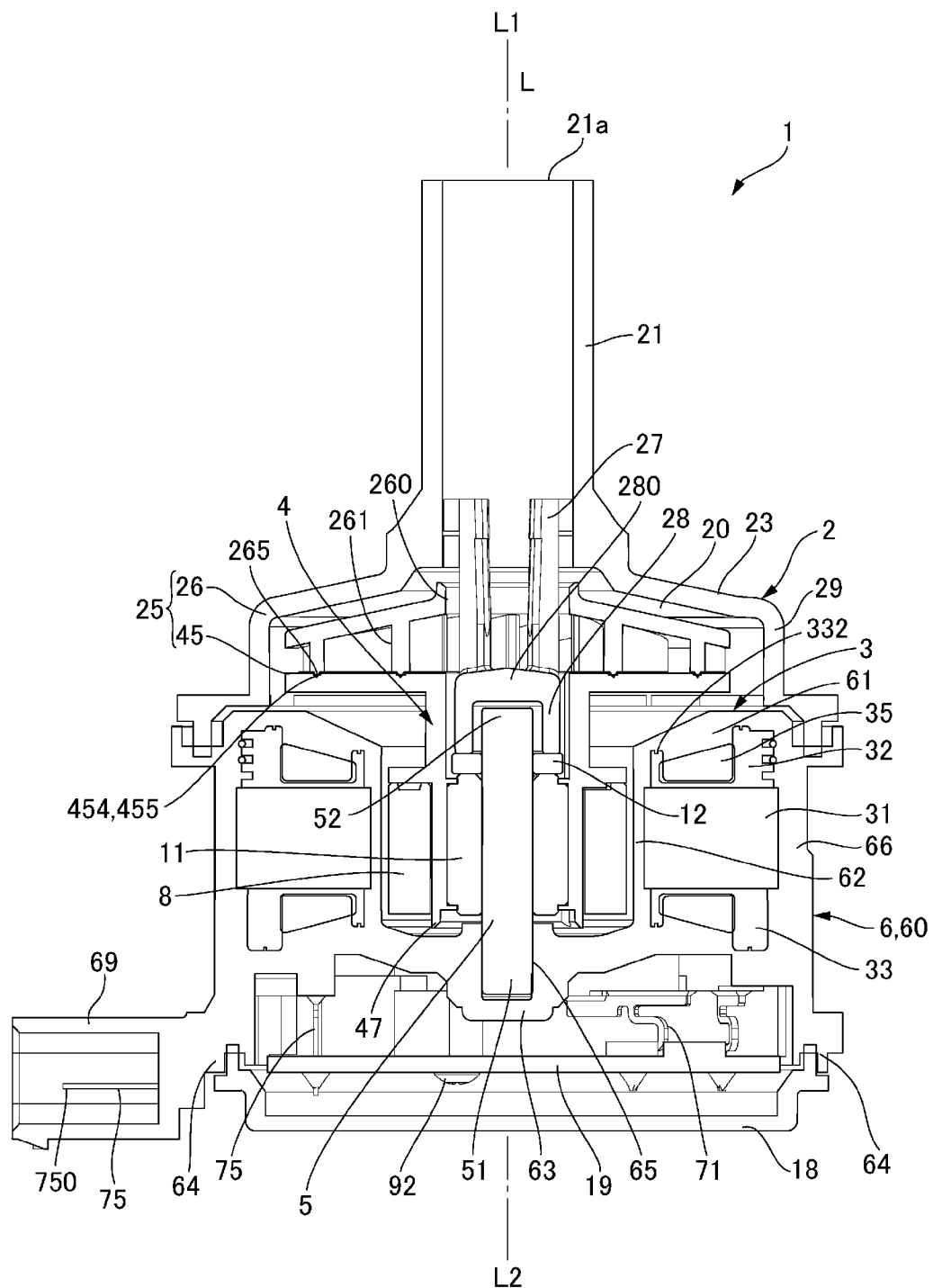
FIG. 2 is a longitudinal cross-sectional view showing the pump device and the motor in FIG. 1.
Figure 3:
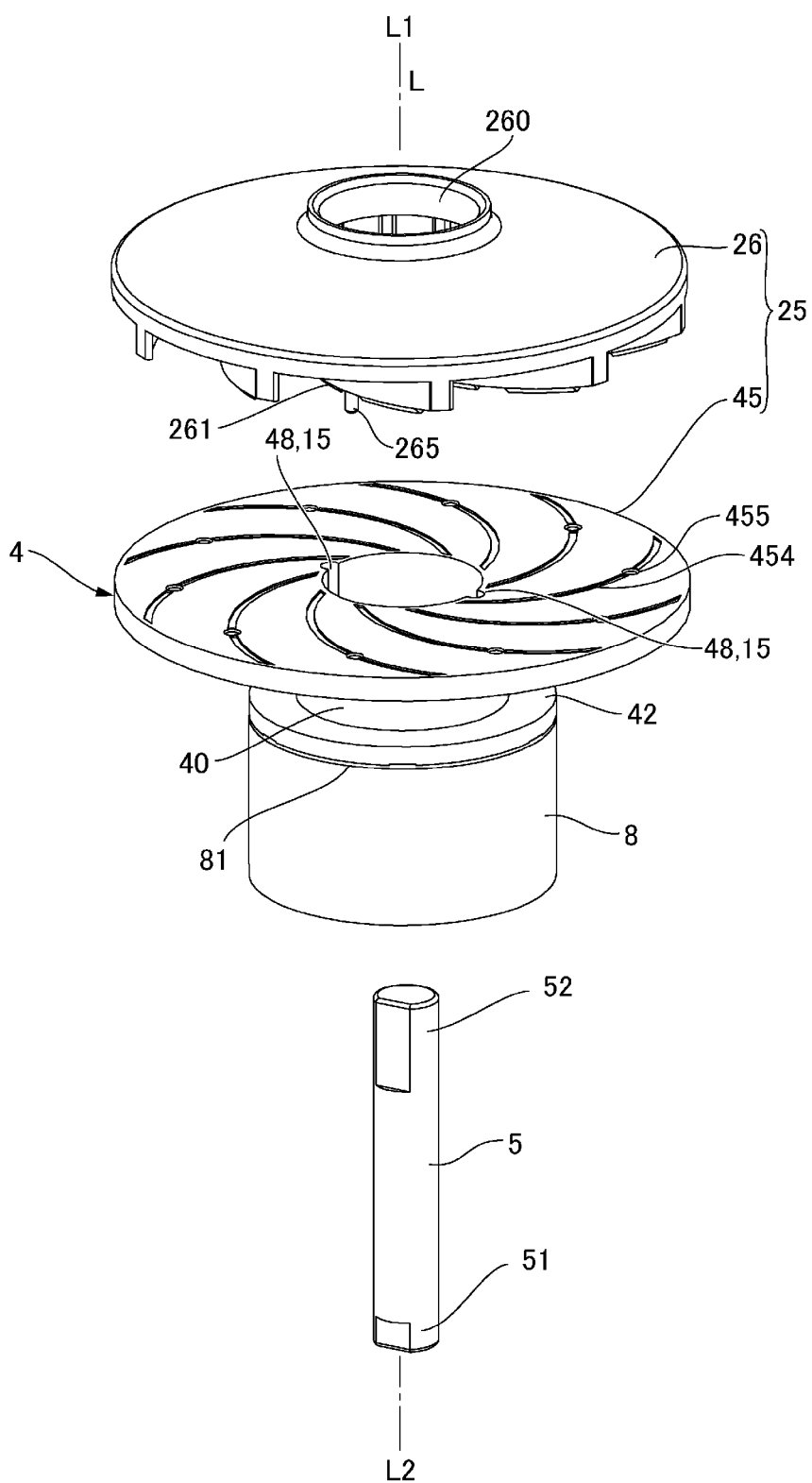
FIG. 3 is an explanatory view showing an impeller and the like in FIG. 2.

FIG. 1 is a perspective view showing an embodiment of a pump device 1 and a motor 10 to which the disclosure is applied. FIG. 2 is a longitudinal cross-sectional view showing the pump device 1 and the motor 10 in FIG. 1. FIG. 3 is an explanatory view showing an impeller 25 and the like in FIG. 2. In FIGS. 1 and 2, the pump device 1 includes a case 2 provided with a suction port 21a and a discharge port 22a, the motor 10 disposed on an other side "L2" in a rotation center axial line "L" direction with respect to the case 2, and the impeller 25 disposed in a pump chamber 20 in an inside of the case 2. The impeller 25 is rotationally driven around the rotation center axial line "L" by the motor 10. The motor 10 includes a stator 3 in a cylindrical tube shape, a rotor 4 disposed on an inner side with respect to the stator 3, a housing 6 made of resin which covers the stator 3, and a support shaft 5 in a round bar shape which rotatably supports the rotor 4. The support shaft 5 is made of metal or ceramic. In the pump device 1 in this embodiment, fluid is liquid, and the pump device 1 is used under a condition that environment temperature and fluid temperature are easily changed.

The case 2 structures a wall face 23 on one side "L1" in the rotation center axial line "L" direction of the pump chamber 20, and a side wall 29 which is extended in the circumferential direction. The case 2 is provided with a suction pipe 21 which is extended along the rotation center axial line "L", and a discharge pipe 22 which is extended in a direction perpendicular to the rotation center axial line "L". The suction pipe 21 and the discharge pipe 22 are respectively provided with a suction port 21a and a discharge port 22a at their end parts. The suction pipe 21 is concentrically provided with the rotation center axial line "L".

In the motor 10, the stator 3 includes a stator core 31, insulators 32 and 33 which are held by the stator core 31, and a coil 35 which is wound around the stator core 31 through the insulators 32 and 33.

The rotor 4 is provided with a cylindrical tube part 40 which is extended from a position facing the stator 3 on an inner side in the radial direction toward a pump chamber 20 along the rotation center axial line "L", and the cylindrical tube part 40 is opened in the pump chamber 20. A drive magnet 8 in a cylindrical tube shape is held on an outer peripheral face of the cylindrical tube part 40 so as to face the stator 3 on an inner side in the radial direction. The drive magnet 8 is, for example, a neodymium bond magnet.

Figure 8:
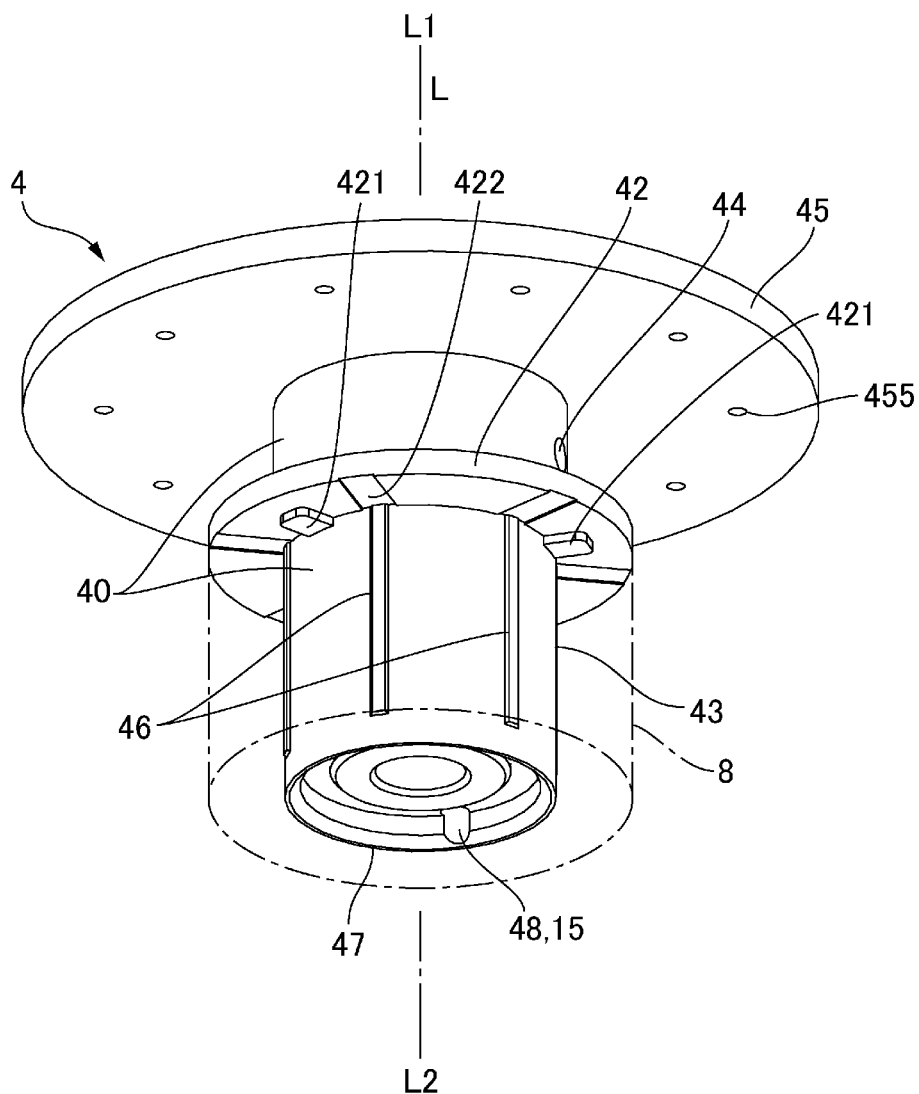
FIG. 8 is a perspective view showing the rotor and the like in FIG. 2 which are viewed from an other side in a rotation center axial line direction.

As shown in FIGS. 2 and 3, an end part of the cylindrical tube part 40 on one side "L1" in the rotation center axial line "L" direction in the rotor 4 is formed with a flange part 45 in a circular plate shape. A circular plate 26 is connected with the flange part 45 from the one side "L1" in the rotation center axial line "L" direction. A center hole 260 is formed at a center of the circular plate 26. A face of the circular plate 26 which faces the flange part 45 is formed with a plurality of blade parts 261 which are curved and extended in a circular arc shape from a periphery of the center hole 260 to an outer side in the radial direction at equal angular intervals. The circular plate 26 is fixed to the flange part 45 through the blade parts 261. Therefore, the impeller 25 connected with the cylindrical tube part 40 of the rotor 4 is structured by the flange part 45 and the circular plate 26. In this embodiment, the circular plate 26 is inclined so that its outer side in the radial direction is located on the flange part 45 side with respect to its inner side in the radial direction. In this embodiment, the flange part 45 is formed with grooves 454 which are overlapped with end parts of the blade parts 261. Further, the flange part 45 is formed with holes 455 at positions overlapping with the grooves 454, and each of the blade parts 261 of the circular plate 26 is formed with a protruded part 265 which is fitted into the hole 455. The hole 455 is a through hole as shown in FIG. 8 which will be described below.

In FIG. 2, in the rotor 4, a radial bearing 11 in a cylindrical tube shape is held on an inner side in the radial direction of the cylindrical tube part 40, and the rotor 4 is rotatably supported by the support shaft 5 through the radial bearing 11. An end part 51 of the support shaft 5 on the other side "L2" in the rotation center axial line "L" direction is held by a shaft hole 65 which is formed in a bottom wall 63 of the housing 6. The case 2 is formed with a receiving part 280 which faces an end part 52 on the pump chamber 20 side of the support shaft 5 on a side of the pump chamber 20 to restrict a movable range of the support shaft 5 to the side of the pump chamber 20. The case 2 is provided with three support parts 27 which are extended from an inner peripheral face of the suction pipe 21 to a side of the motor 10. End parts of the support parts 27 are formed with a tube part 28 in which the end part 52 of the support shaft 5 on the one side "L1" in the rotation center axial line "L" direction is located on its inner side, and the receiving part 280 is structured by a bottom part on the one side "L1" in the rotation center axial line "L" direction of the tube part 28. A thrust bearing 12 in a circular ring shape is attached to the end part 52 of the support shaft 5, and the thrust bearing 12 is located between the radial bearing 11 and the tube part 28. At least parts of the end part 51 of the support shaft 5 and the shaft hole 65 are formed in a "D"-shaped cross section, and the end part 52 of the support shaft 5 and a hole of the thrust bearing 12 are formed in a "D"-shaped cross section. Therefore, turnings of the support shaft 5 and the thrust bearing 12 are prevented.

The housing 6 is a partition member which is provided with a first partition part 61 facing the wall face 23 of the pump chamber 20 and a second partition part 62 which exists between the stator 3 and the drive magnet 8. Further, the housing 6 is provided with a body part 66 in a cylindrical tube shape which covers the stator 3 from an outer side in the radial direction. Therefore, the housing 6 is a resin sealing member 60 which covers the stator 3 from both sides in the radial direction and from both sides in the rotation center axial line "L" direction, and the housing 6 is a resin portion which is formed when the stator 3 is insert-molded with polyphenylene sulfide (PPS) or the like.

An end part 64 on the other side "L2" in the rotation center axial line "L" direction of the housing 6 is fixed with a cover 18 from the other side "L2" in the rotation center axial line "L" direction, and a circuit board 19 provided with a circuit for controlling power feeding to the coil 35 and the like is disposed between the cover 18 and the bottom wall 63 of the housing 6. The circuit board 19 is fixed to the housing 6 by a screw 92. The circuit board 19 is connected by solder with winding terminals 71 made of metal, which are penetrated through the bottom wall 63 of the housing 6 from the stator 3 and protruded to the other side "L2" in the rotation center axial line "L" direction, and connector terminals 75 made of metal which are held by the housing 6. Electronic components structuring a drive circuit are mounted on the circuit board 19. Further, wiring lines and the like are formed on the circuit board 19.

The housing 6 is formed with a connector housing 69 in a tube shape, and end parts 750 of the connector terminals 75 are located on an inner side of the connector housing 69. Therefore, when a connector is connected with the connector housing 69 to supply a signal and the like, the signal is supplied to respective coils 35 through the connector terminals 75, the circuit board 19 and the winding terminals 71. As a result, the rotor 4 is rotated around the rotation center axial line "L". Therefore, the impeller 25 is rotated in an inside of the pump chamber 20 to set the inside of the pump chamber 20 in a negative pressure state and thus, fluid is sucked to the pump chamber 20 through the suction pipe 21 and is discharged from the discharge pipe 22.

Figure 4:
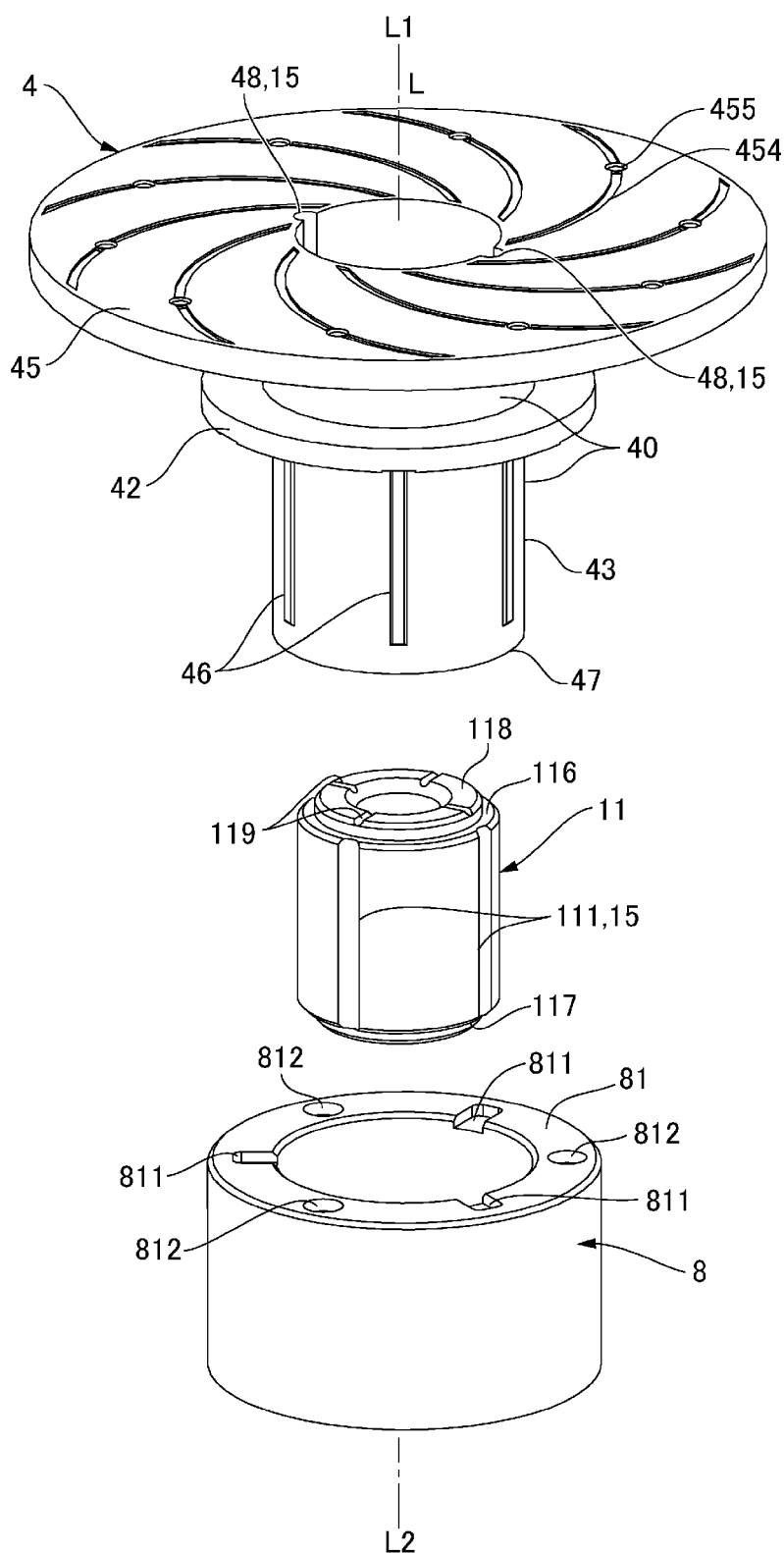
FIG. 4 is a perspective view showing a rotor and the like in FIG. 2.
Figure 5:
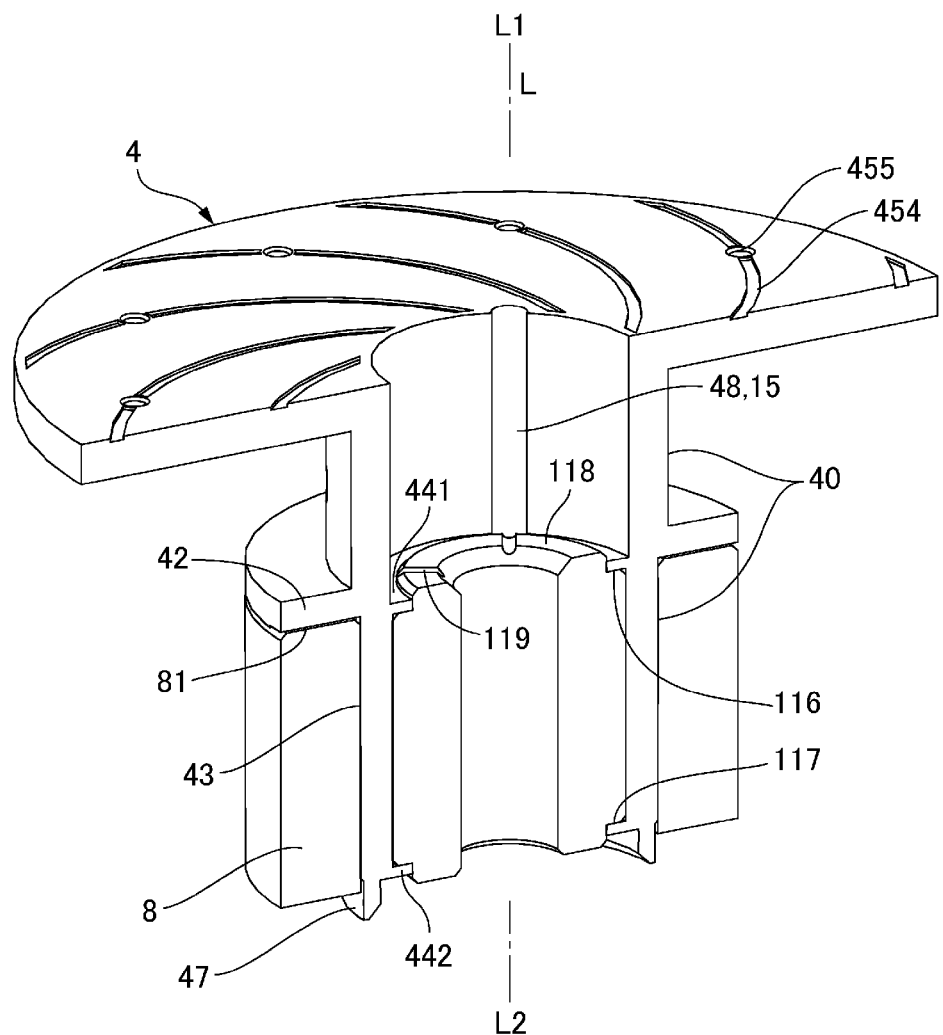
FIG. 5 is a longitudinal cross-sectional view showing a state that a drive magnet is fixed to the rotor shown in FIG. 2.
Figure 6:
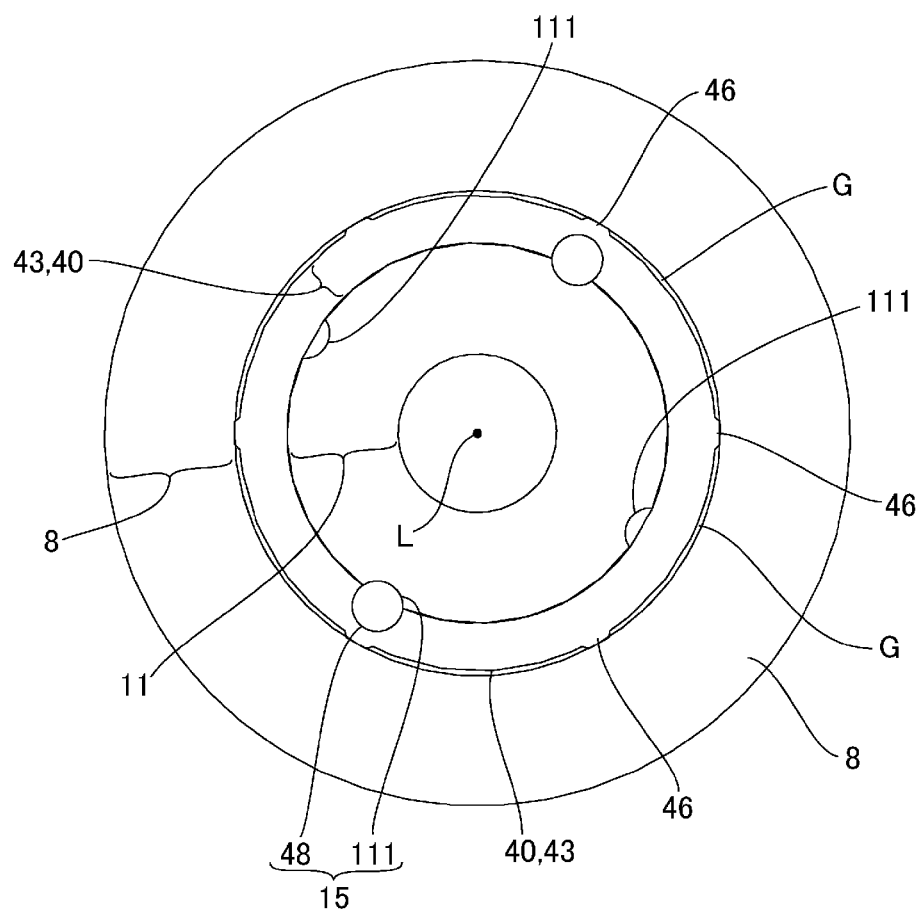
FIG. 6 is a transversal cross-sectional view showing a state that the drive magnet is fixed to the rotor shown in FIG. 2.
Figure 7:
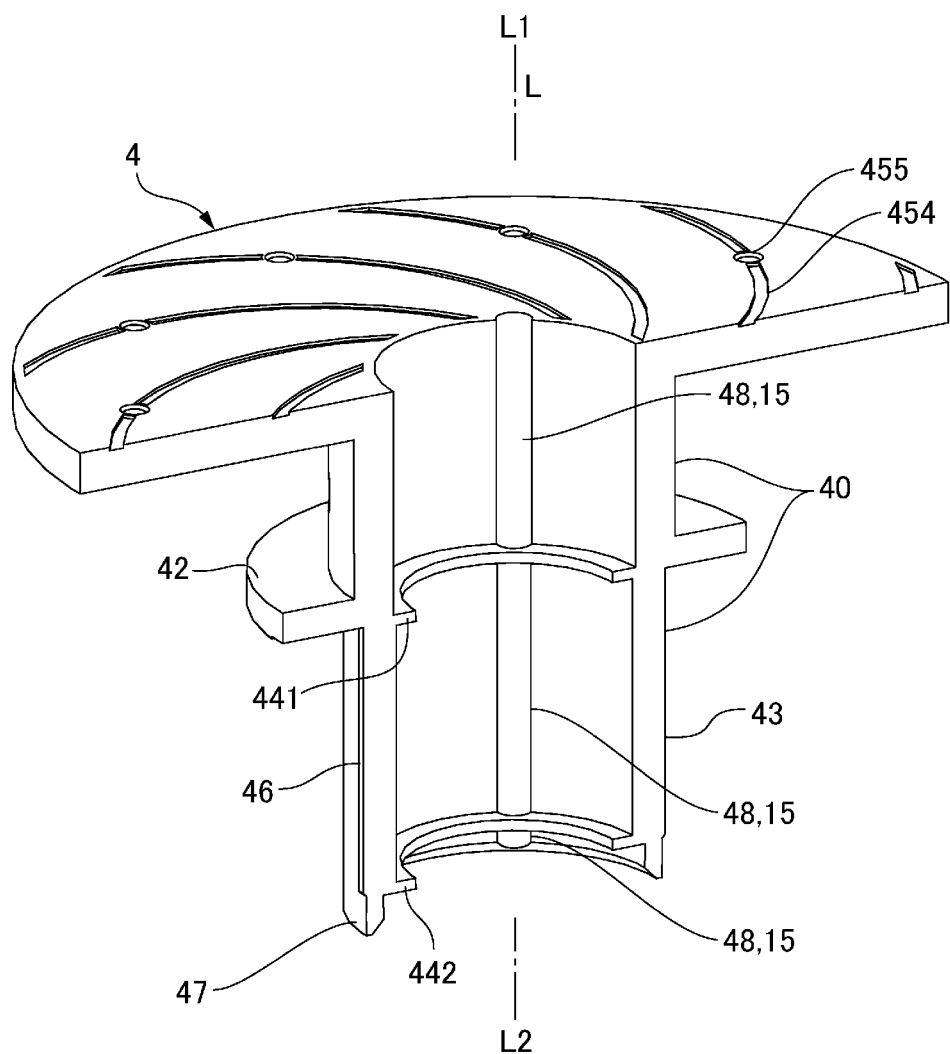
FIG. 7 is a cross-sectional view showing the rotor in FIG. 2.
Figure 9:
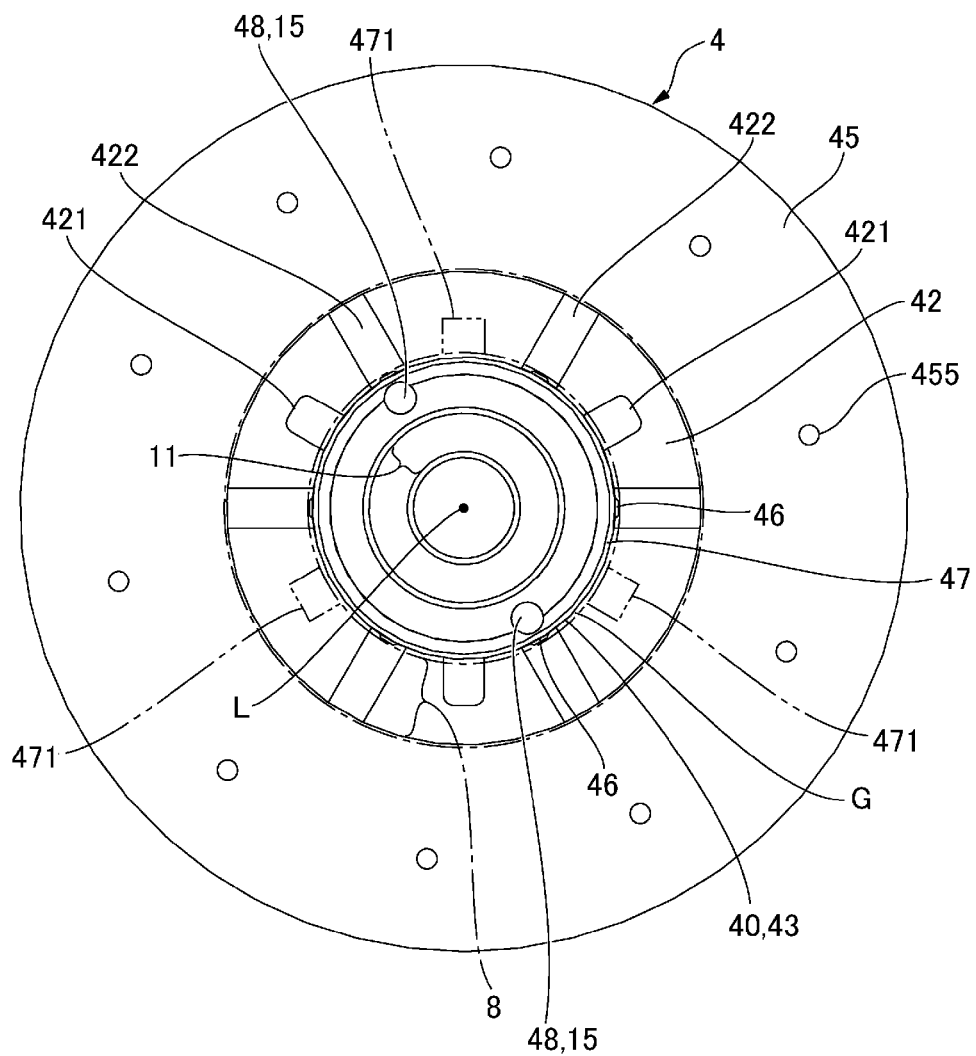
FIG. 9 is a bottom view showing the rotor and the like in FIG. 2 which are viewed from the other side in the rotation center axial line direction.

FIG. 4 is a perspective view showing the rotor 4 and the like in FIG. 2. FIG. 5 is a longitudinal cross-sectional view showing a state that the drive magnet 8 is fixed to the rotor 4 shown in FIG. 2. FIG. 6 is a transversal cross-sectional view showing a state that the drive magnet 8 is fixed to the rotor 4 shown in FIG. 2. FIG. 7 is a longitudinal cross-sectional view showing the rotor 4 in FIG. 2. FIG. 8 is a perspective view showing the rotor 4 and the like in FIG. 2 which are viewed from the other side "L2" in the rotation center axial line direction "L". FIG. 9 is a bottom view showing the rotor 4 and the like in FIG. 2 which are viewed from the other side "L2" in the rotation center axial line direction "L".

As shown in FIGS. 2 and 4 through 9, an outer peripheral side of the cylindrical tube part 40 of the rotor 4 in the motor 10 is formed with a seat part 42 in a circular ring shape which is protruded to an outer side in the radial direction at a position separated to the other side "L2" from the flange part 45. A portion of the cylindrical tube part 40 on the other side "L2" with respect to the seat part 42 is formed as a magnet holding part 43. The magnet holding part 43 is fitted to an inner side of the drive magnet 8 in a cylindrical tube shape to hold the drive magnet 8. In this case, the seat part 42 supports an end part 81 on the one side "L1" of the drive magnet 8.

An inner peripheral side of the cylindrical tube part 40 of the rotor 4 is formed with a first protruded part 441 in a circular ring shape which is protruded to an inner side in the radial direction at a position overlapping with the seat part 42 when viewed in the radial direction, and a second protruded part 442 in a circular ring shape which is protruded to an inner side in the radial direction is formed on the other side "L2" with respect to the first protruded part 441.

Further, a through hole 44 shown in FIG. 8 is provided between the seat part 42 and the flange part 45. The through hole 44 penetrates through the cylindrical tube part 40 in the radial direction. In this embodiment, the through hole 44 is provided in the cylindrical tube part 40 at two angular positions separated by 180 degrees from each other. Therefore, when the impeller 25 is rotated, a part of the fluid is flowed from the pump chamber 20 into an inner side of the cylindrical tube part 40 of the rotor 4 and, after that, the fluid is flowed to the pump chamber 20 again along a bottom wall 24 by passing the through hole 44 of the cylindrical tube part 40. Therefore, air mixed in the fluid is discharged from the pump chamber 20.

In the rotor 4 structured as described above, an outer peripheral face of the magnet holding part 43 is provided with ribs 46 which are extended along the rotation center axial line "L" at a plurality of positions in the circumferential direction, and the drive magnet 8 is press-fitted to the magnet holding part 43 so as to contact with a plurality of the ribs 46 from an outer side in the radial direction. Therefore, in a portion between the magnet holding part 43 and the drive magnet 8, a gap space "G" (see FIG. 6) is formed between two ribs 46 adjacent to each other in the circumferential direction.

Further, the seat part 42 is formed with protruded parts 421 which are fitted to recessed parts 811 formed at the end part 81 on the one side "L1" of the drive magnet 8. The protruded part 421 determines an angular position in the circumferential direction of the drive magnet 8 by fitting to the recessed part 811 and prevents turning of the drive magnet 8. Further, the seat part 42 is formed with recessed parts 422 at positions separated in the circumferential direction from the protruded part 421, and the recessed part 422 is extended from an inner edge of the seat part 42 to its outer edge. The recessed part 422 is connected with the gap spaces "G" between two ribs 46 adjacent to each other in the circumferential direction when the drive magnet 8 is fixed to the magnet holding part 43.

An end part 47 of the cylindrical tube part 40 on an opposite side to the seat part 42 is provided with a caulked part 471 (see FIG. 9) overlapped with the drive magnet 8 at a plurality of positions in the circumferential direction, and at least a portion of the gap space "G" is opened between two caulked parts 471 adjacent to each other in the circumferential direction among a plurality of the caulked parts 471.

In this embodiment, the rib 46 and the recessed part 422 are formed at six positions in the circumferential direction at equal angular intervals, and the recessed part 811, the protruded part 421 and the caulked part 471 are formed at three positions in the circumferential direction at equal angular intervals. The end part 81 of the drive magnet 8 is formed at a position separated in the circumferential direction from the recessed part 811 with gate marks 812, which are formed when the drive magnet 8 is molded, at three positions in the circumferential direction at equal angular intervals.

In the pump device 1 including the motor 10 structured as described above, when the drive magnet 8 which is to be provided in the motor 10 for driving the impeller 25 is press-fitted to the cylindrical tube part 40, the drive magnet 8 is abutted with the ribs 46 formed on the cylindrical tube part 40 of the rotor 4 from an outer side in the radial direction. Therefore, eccentricity of the drive magnet 8 with respect to the cylindrical tube part 40 can be suppressed. Further, the drive magnet 8 and the cylindrical tube part 40 are contacted with each other through the ribs 46. Therefore, even when temperature change rapidly occurs, large stress is hardly applied to the drive magnet 8 and thus, cracking of the drive magnet 8 can be suppressed.

Further, the seat part 42 which supports the end part 81 of the drive magnet 8 in the rotor 4 is provided with the recessed part 422 at a plurality of positions in the circumferential direction, and the gap space "G" which is provided between the cylindrical tube part 40 and the drive magnet 8 and surrounded by two adjacent ribs 46 in the circumferential direction is connected with the recessed part 422. Therefore, the fluid which flows through the pump device 1 is capable of flowing through the recessed parts 422 of the seat part 42 and the gap spaces "G" between the cylindrical tube part 40 and the drive magnet 8. Accordingly, the rotor 4 and the drive magnet 8 can be cooled down and thus, heat generation of the drive magnet 8 and the like can be suppressed.

Further, the end part 47 of the cylindrical tube part 40 on an opposite side to the seat part 42 is provided with the caulked part 471 overlapped with the drive magnet 8 at a plurality of positions in the circumferential direction, and at least a portion of the gap space "G" is opened between two adjacent caulked parts 471 in the circumferential direction among a plurality of the caulked parts 471. Therefore, the fluid flowing through the recessed parts 422 of the seat part 42 and the gap spaces "G" between the cylindrical tube part 40 and the drive magnet 8 can be passed across the caulked part 471 and thus, heat generation of the drive magnet 8 and the like can be efficiently suppressed.

Figure 10:
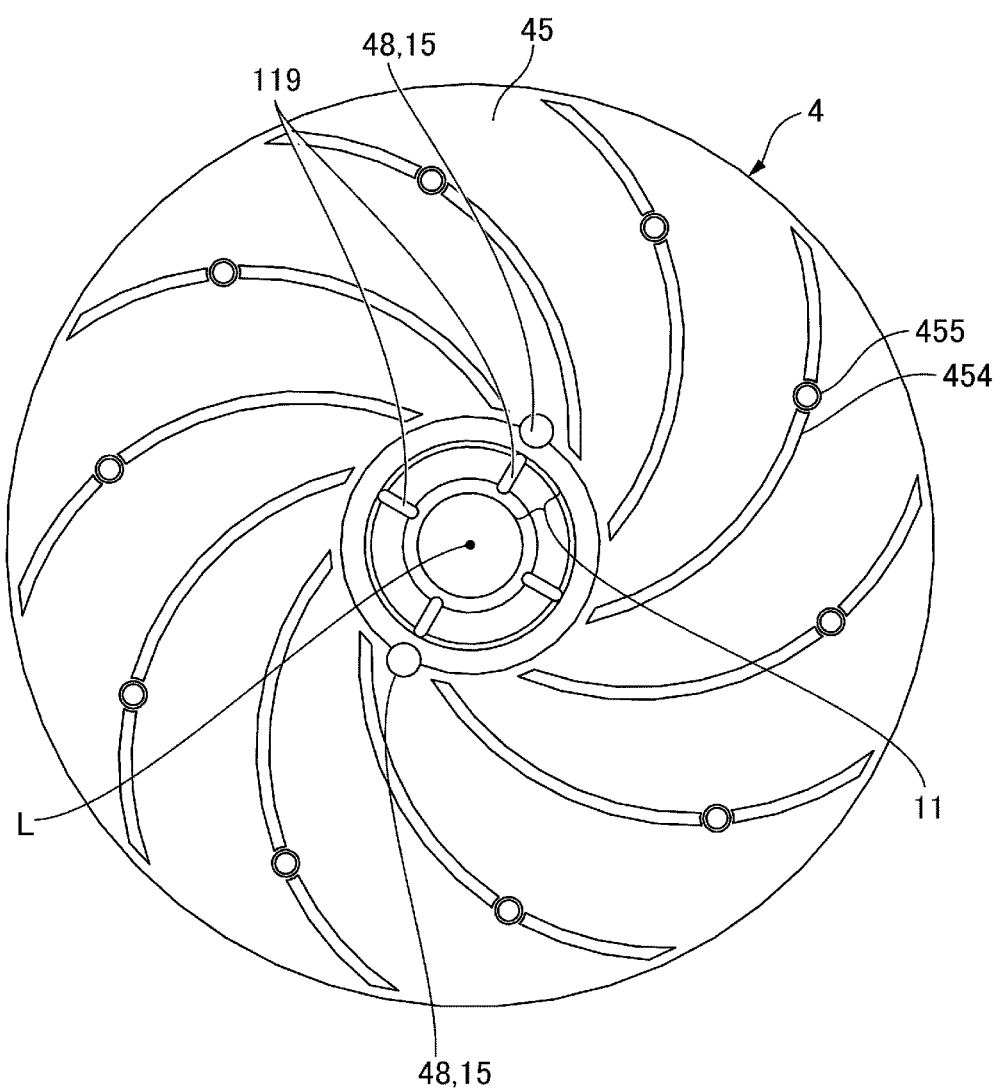
FIG. 10 is a plan view showing the rotor and the like in FIG. 2 which are viewed from one side in the rotation center axial line direction.

FIG. 10 is a plan view showing the rotor 4 and the like in FIG. 2 which are viewed from the one side "L1" in the rotation center axial line "L" direction. As shown in FIGS. 4 through 7, in the motor 10 and the pump device 1, a penetration part 15 is provided between the cylindrical tube part 40 of the rotor 4 and the radial bearing 11 so as to penetrate through both sides in the rotation center axial line "L". The penetration part 15 is structured of a first groove 48, which is extended along the rotation center axial line "L" on an inner peripheral face of the cylindrical tube part 40, and a second groove 111 which is extended along the rotation center axial line "L" on an outer peripheral face of the radial bearing 11. More specifically, the second groove 111 is overlapped with the first groove 48 from an inner side in the radial direction to structure the penetration part 15 together with the first groove 48. Each of the first groove 48 and the second groove 111 is a groove having a semicircular cross section. Therefore, the penetration part 15 is linearly extended in a hole shape whose cross section is circular. In this embodiment, the second groove 111 is formed at four positions in the circumferential direction at equal angular intervals and the first groove 48 is formed at two positions in the circumferential direction at equal angular intervals. Therefore, the two first grooves 48 are overlapped with two of the four second grooves 111 from an outer side in the radial direction to structure the penetration parts 15.

The first groove 48 in the cylindrical tube part 40 is provided at an angular position overlapping with the rib 46 when viewed in the radial direction. Therefore, wall thickness of the cylindrical tube part 40 can be suppressed by the rib 46 from becoming excessively thin due to formation of the first groove 48.

In this embodiment, the cylindrical tube part 40 is formed with a first protruded part 441 and a second protruded part 442 which are formed in a circular ring shape and are protruded to an inner side in the radial direction to overlap with a step part 116 of the radial bearing 11 on the one side "L1" in the rotation center axial line "L" direction and a step part 117 on the other side "L2" in the rotation center axial line "L" direction. On the other hand, the first groove 48 is formed along the inner peripheral face of the cylindrical tube part 40. Therefore, the first groove 48 penetrates through the first protruded part 441 and the second protruded part 442 as a circular hole, and the first groove 48 does not reach an inner edge of the first protruded part 441 and an inner edge of the second protruded part 442. Accordingly, each of the inner edge of the first protruded part 441 and the inner edge of the second protruded part 442 is formed in a continuous circular arc shape.

As described above, in this embodiment, the penetration part 15 is provided which penetrates through the rotor 4 to both sides in the rotation center axial line "L" and thus, a large difference in pressure is hardly generated on both sides in the rotation center axial line "L" direction with respect to the rotor 4. Therefore, the rotor 4 is hardly vibrated in the rotation center axial line "L" direction. In this embodiment, the penetration part 15 is structured of the first groove 48 formed on the inner peripheral face of the cylindrical tube part 40 and the second groove 111 formed on the outer peripheral face of the radial bearing 11 which are overlapped with each other in the radial direction. Therefore, even in a case that the penetration part 15 is formed so as to have a sufficient opening area, an opening area of the first groove 48 can be reduced. Accordingly, strength of the cylindrical tube part 40 is hardly decreased due to the first groove 48 and thus, an outside diameter of the cylindrical tube part 40 is not required to increase.

Further, the first groove 48 and the second groove 111 are extended linearly. Therefore, the rotor 4 can be structured as a resin molded product in which the radial bearing 11 is insert-molded. More specifically, when insert molding is to be performed, a pin whose cross section is circular is disposed in the second groove 111 of the radial bearing 11 in a metal mold and, after the insert molding is performed, the pin is removed. As a result, the rotor 4 can be produced by insert molding in a state that the penetration part 15 is formed.

Further, an end part 118 on the one side "L1" in the rotation center axial line "L" direction of the radial bearing 11 is provided with groove-shaped marks 119 which indicate positions of the second grooves 111. Therefore, when insert molding is to be performed, arrangement of the pins and the like can be performed with the marks 119 provided on the end part 118 of the radial bearing 11 as a reference.

In the embodiment described above, the housing 6 is the resin sealing member 60 which covers the stator 3 from both sides in the radial direction and from both sides in the rotation center axial line "L" direction. However, the disclosure may be applied to a case that the housing 6 is a member which covers the stator 3 only on an inner side in the radial direction and only on the other side "L2" in the rotation center axial line "L" direction. Further, the disclosure may be applied to a case that a penetration part is provided only in the cylindrical tube part 40.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A pump device comprising:
   a motor; and
   an impeller disposed in a pump chamber provided on one side in a rotation center axial line with respect to the motor and connected with a rotor of the motor;
   wherein the rotor is made of resin;
   wherein the rotor comprises:
      a seat part supporting an end part on one side of a drive magnet in a cylindrical tube shape; and
      a cylindrical tube part extended from the seat part along the rotation center axial line and fitted to an inner side of the drive magnet;
   wherein an outer peripheral face of the cylindrical tube part comprises a plurality of ribs, each of the plurality of ribs extends in a direction of the rotation center axial line and each of the plurality of ribs is spaced apart from each other in a circumferential direction of the cylindrical tube part; and
   wherein the drive magnet is press-fitted to the cylindrical tube part so as to contact the plurality of ribs from an outer side in a radial direction,
   wherein the seat part comprises a plurality of recessed parts provided at a plurality of positions in the circumferential direction, and
   wherein in the circumferential direction between the cylindrical tube part and the drive magnet, a gap space is provided between every two adjacent ribs among the plurality of ribs to form a plurality of the gap spaces, each gap space is connected with two recessed parts among the plurality of recessed parts,
   wherein an end part of the cylindrical tube part on an opposite side to the seat part comprises a plurality of caulked parts overlapped with the drive magnet at a plurality of positions in the circumferential direction, and
   wherein at least a portion of the gap space is opened between two caulked parts that are adjacent to each other in the circumferential direction among the plurality of caulked parts provided at the plurality of positions.

2. The pump device according to claim 1, wherein the cylindrical tube part comprises a penetration part penetrating both sides in the rotation center axial line at an angular position overlapping with one of the ribs when viewed in the radial direction.

3. The pump device according to claim 1, wherein the cylindrical tube part comprises a penetration part penetrating both sides in the rotation center axial line when viewed in the radial direction.

4. A pump device comprising:
   a motor; and
   an impeller disposed in a pump chamber provided on one side in a rotation center axial line with respect to the motor and connected with a rotor of the motor;

wherein the rotor is made of resin;
wherein the rotor comprises:
  a seat part supporting an end part on one side of a drive magnet in a cylindrical tube shape; and
  a cylindrical tube part extended from the seat part along the rotation center axial line and fitted to an inner side of the drive magnet;
wherein an outer peripheral face of the cylindrical tube part comprises a plurality of ribs, each of the plurality of ribs extends in a direction of the rotation center axial line and each of the plurality of ribs is spaced apart from each other in a circumferential direction of the cylindrical tube part; and
wherein the drive magnet is press-fitted to the cylindrical tube part so as to contact the plurality of ribs from an outer side in a radial direction,
wherein the cylindrical tube part comprises a penetration part penetrating both sides in the rotation center axial line when viewed in the radial direction,
wherein the cylindrical tube part holds a radial bearing in a cylindrical tube shape on an inner side of the cylindrical tube part, and the penetration part comprises:
  a first groove extended along the rotation center axial line on an inner peripheral face of the cylindrical tube part; and
  a second groove extended along the rotation center axial line on an outer peripheral face of the radial bearing and overlapped with the first groove from an inner side in the radial direction.

5. The pump device according to claim 4, wherein the rotor is a resin molded product in which the radial bearing is insert-molded.

6. The pump device according to claim 5, wherein an end part on one side in a rotation center axial line direction of the radial bearing comprises a mark indicating a position of the second groove.

7. The pump device according to claim 4, wherein the first groove is provided at an angular position overlapping with one of the ribs when viewed in the radial direction.

\* \* \* \* \*